(No Model.)
J. H. SPENCER.
PROCESS OF CLEANING NUTS, &c.
No. 374,012. Patented Nov. 29, 1887.
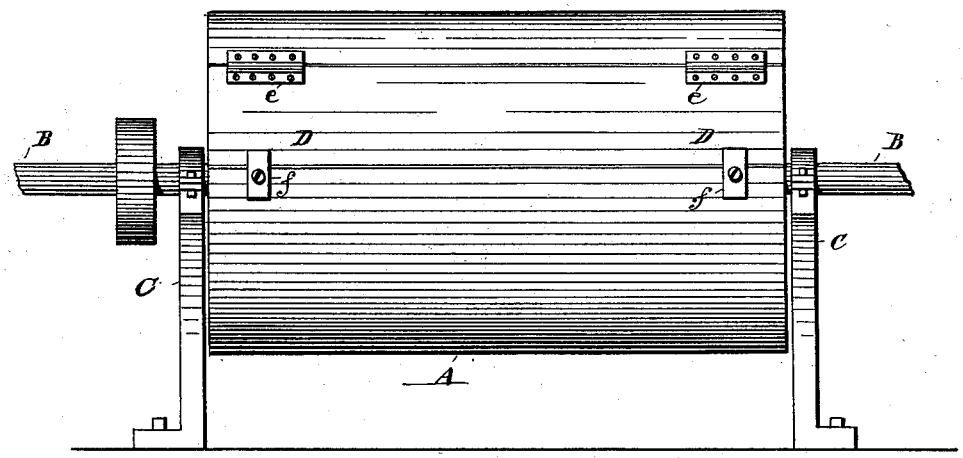
Witnesses
R. J. van Boskerck
Mary Sheridan
Inventor
James H. Spencer
Per Frost & Coe
Attys

UNITED STATES PATENT OFFICE.

JAMES H. SPENCER, OF NEW YORK, N. Y., ASSIGNOR TO ALICE F. SPENCER, OF SAME PLACE.

PROCESS OF CLEANING NUTS, &c.

SPECIFICATION forming part of Letters Patent No. 374,012, dated November 29, 1887.

Application filed August 13, 1886. Serial No. 210,765. (No model.)

*To all whom it may concern:*

Be it known that I, JAMES H. SPENCER, a citizen of the United States, residing in the city, county, and State of New York, have invented a new and useful Process for Cleaning Nuts, Beans, and other Like Articles, of which the following, taken in connection with the accompanying drawing, is a full, clear, and accurate description.

The object of my invention is to remove the dirt and other foreign substances from the shells or outer surfaces of nuts, beans, and other like articles in such a manner as to prevent abrasion or injury of the surfaces treated, while at the same time the outer surfaces of such articles are so thoroughly cleansed and polished as to be in a condition for ready sale and market.

The drawing accompanying this specification and forming a part thereof represents a machine which I prefer to use in connection with and to carry out my process; but any other machine of the same general character can be used to carry on my process, as will be readily seen.

My process consists in placing the nuts or beans, &c., in the condition they are received by the importers or persons purchasing the same, intermingled with dirt and other foreign substances, with their shells rough or mildewed, and a quantity of sawdust or similar vegetable fiber dampened, as explained below, in a tumbling-machine, and revolving the same until, by the friction of the sawdust and nuts or beans, the impurities are removed and the outer surfaces of such nuts, beans, or other like articles subjected to this treatment are thoroughly cleansed and polished.

To clean the nuts and other articles from which the shells have not been removed, and nuts the shells of which are mildewed on the outside, moldy, dirty, or discolored, I mix in the tumbling-machine with about seven hundred and fifty or one thousand pounds of the nuts, &c., to be treated about a barrel of sawdust which has been previously dampened or wet with about five pails of water, to which water has been added about two per cent. of commercial sulphuric acid. The tumbling-machine is then revolved for about half an hour at a rate of speed of about twenty revolutions per minute. The nuts are then taken out of the tumbling-machine and the sawdust sifted out by any proper means, while the nuts are spread out to dry. After drying, they are placed in a wire cylinder or brushed to remove any sawdust or foreign substance that may remain.

The above is simply a general directive formula to be varied according to the quantity of the goods or articles to be treated, and I do not intend to confine myself to the proportions, rates of speed, or time above detailed, the essence of my process consisting in mixing the articles to be treated with sawdust dampened as a protection for the nuts while they are tumbled, while at the same time the sawdust acts as an elastic brush, cleanser, and absorbent to remove dirt and impurities.

In the drawing, which is simply shown as a specimen of a tumbling-machine, A represents a hollow drum or cylinder for holding the articles to be treated. This cylinder is mounted on suitable axles, B, journaled in suitable supports, C, in such manner that the cylinder can by driven by any suitable applied power. I prefer, however, to use steam-power, which can be applied to work the tumbling-cylinder A by suitable pulleys and shafting in any ordinary way.

The tumbling-cylinder A is provided with a cover or door, D, which is so hinged at *e e* as to be opened to receive the articles to be treated, and when the cylinder is in operation it is securely closed by a button or fastening, F.

I am aware that it has been proposed to clean grain by mixing therewith a quantity of dry bran and then agitating it. I am also aware that it has been proposed to remove the short fiber adhering to cotton-seed by subjecting the seed to the action of sulphuric acid and neutralizing the effects of the acid by subsequently mixing with the seed a quantity of alkaline earth, and, furthermore, that it has been proposed to clean nuts by mixing with them a quantity of river sand moistened with diluted lye and subjecting them to the action of a tumbling-machine. None of these are the equivalent of my process above set forth.

Having thus described my invention, what I claim, and desire to secure by Letters Patent, is—

1. The process of cleaning nuts, which consists in mixing therewith a quantity of damp sawdust, agitating them while in this condition, and subsequently separating them from the sawdust and other impurities.

2. The process of cleaning nuts, which consists in mixing therewith a quantity of sawdust dampened with acidulated water, agitating them while thus commingled with the sawdust, and then removing the sawdust, dirt, &c., substantially as set forth.

3. The process of cleaning nuts, which consists in mixing therewith a quantity of damp sawdust to which has been added a quantity of sulphuric acid, agitating them while commingled with this damp acidulated sawdust, and subsequently freeing them of the sawdust, &c., substantially as set forth.

In testimony whereof I have hereunto set my hand this 11th day of August, 1886.

JAS. H. SPENCER.

In presence of—
R. F. VAN BOSKERCK,
MARY SHERIDAN.